(12) United States Patent
Kitko et al.

(10) Patent No.: US 6,649,891 B1
(45) Date of Patent: Nov. 18, 2003

(54) MICROWAVABLE FOOD STORAGE CONTAINER

(75) Inventors: Anne M Kitko, Seffner, FL (US); Ray L. Hauser, Boulder, CO (US)

(73) Assignee: Anne Kitko, Seffner, FL (US)

( * ) Notice: Subject to any disclaimer, the term of this patent is extended or adjusted under 35 U.S.C. 154(b) by 128 days.

(21) Appl. No.: 09/962,505

(22) Filed: Sep. 25, 2001

(51) Int. Cl.[7] ................................................ H05B 6/80
(52) U.S. Cl. ....................................... 219/732; 219/725
(58) Field of Search ................................. 219/732, 725; 220/23.83, 23.86, 23.87, 62.12, 62.13, 62.15, 62.22; 215/12.1, 13.1

(56) References Cited

U.S. PATENT DOCUMENTS

| 3,767,496 | A | | 10/1973 | Amberg et al. |
| 3,878,960 | A | | 4/1975 | Jonsson et al. |
| 3,903,339 | A | | 9/1975 | Brockway et al. |
| 4,040,535 | A | * | 8/1977 | Shephard ..................... 215/395 |
| 4,084,330 | A | * | 4/1978 | Fraser ............................ 34/92 |
| 4,238,041 | A | | 12/1980 | Jonsson et al. |
| 4,315,573 | A | | 2/1982 | Bradley et al. |
| 4,429,798 | A | * | 2/1984 | Borows ....................... 215/12.1 |
| 4,847,459 | A | | 7/1989 | Desai |
| 4,848,541 | A | | 7/1989 | Paliotta et al. |
| 4,860,906 | A | | 8/1989 | Pellegrini et al. |
| 5,085,904 | A | | 2/1992 | Deak et al. |
| 5,894,948 | A | * | 4/1999 | Yeh ............................. 215/12.1 |
| 5,908,128 | A | | 6/1999 | Krishnakumar et al. |
| 5,986,248 | A | | 11/1999 | Matsuno et al. |
| 6,405,892 | B1 | * | 6/2002 | Volan ..................... 220/592.17 |

* cited by examiner

Primary Examiner—Quang T. Van
(74) Attorney, Agent, or Firm—David Kiewit

(57) ABSTRACT

A food container for use in a microwave oven is made from an inner, food contacting, glass vessel an outer plastic vessel. Because of the external plastic layer, the container has a significantly higher thermal insulating capability than a comparable glass container. This reduces the cooling rate of cooked food and provides an extra margin of handling safety. On the other hand, the internal glass vessel will not impart a plastic flavor to food stored or cooked in the vessel, and will be immune to the blistering or discoloration that sometimes occurs with plastic vessels. In some versions of the invention, free-standing glass and plastic vessels are arranged to be interfitted for use in food storage and microwave cooking, but can be easily separated for cleaning. In other versions, the glass and plastic vessels are intimately bonded together to prohibit penetration of moisture between the two vessels.

11 Claims, 2 Drawing Sheets

MICROWAVABLE FOOD STORAGE CONTAINER

CROSS REFERENCE TO RELATED APPLICATIONS

Not Applicable

BACKGROUND OF THE INVENTION

1. Field of the Invention

The present invention concerns a reusable, microwave transmissive, impact-resistant food container adapted for warming food in a microwave oven. The container is characterized by good chemical inertness to cold and hot food, when compared to plastic containers.

2. Background Information

Almost every household and workplace has a microwave oven in which to heat or cook food or liquids. In the typical microwave oven, a magnetron functions to generate microwave energy at a frequency of about 2.5 GHz. This energy is conveyed by a wave-guide to the interior of the oven to irradiate the food placed therein. Because food having some water content tends to absorb microwave energy, this gives rise to internal molecular motion, i.e., thermal energy, which heats the food. Some food products are heated more rapidly than others in a microwave oven; but in general the cooking of food or liquids by microwave energy is much faster than by conventional heating techniques, including infrared radiation. In heating or cooking food in a microwave oven, the food is placed in a receptacle made of a microwave-safe synthetic plastic, glass or other material which is transparent or non-reactive to microwave energy; hence, it is only the food that is heated.

The conventional microwave food heating containers are generally made of a microwave-safe plastic or glass or other microwave transparent material, but these containers have certain inherent disadvantages which have not hitherto been overcome.

Glass containers are highly favored for their transparency and wear resistance. Modern glass containers can be taken from a refrigerator and placed directly into a microwave oven for heating of food. Glass containers are scour resistant, easy to clean, and dishwasher safe. However, they have certain disadvantages. They are easy to break or chip. They are good conductors of heat, so food warmed in a glass container tends to cool rapidly after removal from the microwave oven. Further, because it is difficult to visually determine the temperature of a glass container, the accidental picking up of a hot glass container can result in skin burns.

Plastic containers, on the other hand, are much more resistant to breakage than glass. However, they do not have the heft or brilliance of glass, and thus are considered to be less desirable food containers. Further, they tend to impart a "plastic" odor or taste to food items stored in plastic containers for long periods of time. Further, when heating food such as spaghetti sauce, the sauce tends to impregnate the plastic along the top of the spaghetti sauce where the sauce gets hottest during heating. Such rings can never be removed from the plastic and create such an unattractive appearance that the damaged cookware is usually discarded, even though functional. Further yet, plastic dishes are easily scratched or gouged if cleaned with scouring powders or cleaning utensils.

In U.S. Pat. No. 5,986,248, Matsuno et al describe a food container that is generally microwave-transparent, but that comprises one or more non-transmissive insular areas at selected locations of the container so as to improve the uniformity of microwave heating of the contained food. The non-transmissive islands are preferably formed from pieces of aluminum foil or use very thin vapor deposited aluminum films on plastic foil substrates.

It has been known from the bottle art that the advantages of; glass and plastic can be combined by making a single container having two layers, an outer layer of plastic and an inner layer of glass.

For example, U.S. Pat. No. 3,767,496 (Amberg et al) teaches putting a plastic skin on a glass bottle by shrinking a sheet of heat-shrink plastic onto the bottle. Information can be printed on the plastic outer layer, and the plastic helps protect the bottle to some limited degree from chipping. If the contents of the bottle are to be heated, they are removed and poured into a pot or other heating utensil.

U.S. Pat. No. 3,903,339 (Brockway et al) teaches a glass container coated with a plastic containment film for improving the mechanical service strength and shatter resistance of the glass container. The plastic forms a thin skin, only about 2 to 5 thousandths of an inch thick, that commonly escapes notice on a casual inspection of the product. This film protects the glass from scratches which weaken the glass.

U.S. Pat. No. 4,238,041 (Jonsson et al) teaches a plastic coated glass container, made by passing a heated bottle through a fluidized bed of plastic powder. The plastic melts and adheres to the bottle, providing a scratch resistant surface.

As is apparent from the above, bottles are small-mouthed containers traditionally associated with liquids, and particularly cool liquids. Bottles are not suitable for heating, because the small mouth of a bottle provides little room for escape of steam. If one were to attempt to boil liquids in a bottle, the liquids would be violently expelled from the bottle by the rapidly expanding steam bubbles. Further, bottles can not serve as containers for foods, because it would be difficult to remove solid food through the neck of a bottle. Thus, the application of thin films or coating layers of plastic onto bottles to improve impact resistance has had no relevance to the food container art.

U.S. Pat. No. 4,315,573 (Bradley et al) teaches a method of strengthening a single use, disposable glass shipping and delivery container such as a jar for containing foodstuffs. A thin sleeve of plastic, such as a foamed thermoplastic, is applied to the heel of the jar. This layer is indicated as improving both the thermal and physical shock strength of the glass, enabling the glass container to withstand cooling and microwave heating. The container is obviously a disposable container, and is not suitable as a reusable food container.

Paliotta et al, in U.S. 4,848,541, teach a shipping and display container for use with glass, ceramic, or other frangible cookware vessels. Their container may be made from three sheets of a thermoplastic material, one of which is configured as an outer plastic container into which the cookware vessel fits loosely; a second may be an impact protection sheet extending across the mouth of the cookware vessel between the cookware vessel and a lid; and the third of which extends above the lid so as to seal both the cookware vessel and the lid within the shipping container. The three sheets may be welded around a common periphery to form a plastic container that the purchaser has to cut apart and destroy in order to get access to the cookware vessel and lid.

Various attempts have been made to improve microwave cookware. The general strategy has been to provide a thermally insulating layer of air between two containers of similar materials, which are generally either glass or plastic. For example, in U.S. Pat. No. 4,847,459 Desai teaches a bowl-shaped plastic structure for use in microwave ovens. Desai's structure comprises two plastic shells separated by a sealed air chamber. Because the container is made of plastic, it has all the problems associated with plastic, as discussed above.

There is thus a need for a reusable food container which does not suffer any of the disadvantages of either glass or plastic, but offers the advantages of both.

It is an object of the present invention to provide a food container which can have a long useful life, which does not impart a plastic smell or taste to food contained therein even after long periods of time, which is more shatter resistant than glass, which is easily cleaned, and in which food can be heated in a microwave oven even immediately after removal from a refrigerator.

BRIEF SUMMARY OF THE INVENTION

In view of the foregoing disadvantages inherent in known food containers, a food container has been developed that is surprisingly free of the above mentioned disadvantages, and that offers a surprising number of advantages. Such a food container has significant and unexpected advantages if made of an inner layer, or vessel, of glass and an outer layer, or vessel, of plastic, with the plastic layer having a thickness comparable to that of the glass and covering the bottom and at least most of the sides of the glass vessel.

Because of the presence of the external plastic layer, the container has a significantly higher thermal insulating capability than a comparable glass container. This reduces the cooling rate of cooked food and provides an extra margin of handling safety in that there is less risk of a user being burned by picking up a glass container full of hot food.

While retaining many of the advantages of a plastic container, the container has an internal layer which is inert to food. Thus, food stored in the container will not acquire the taste or smell of plastic, even after long periods of storage. Further, food heated in such a container, even if brought to a boil, will not cause blistering or discoloration of the inside surface of the container.

The food container of the present invention has a receptacle part and, preferably, a lid part which form-fittingly covers a mouth of the receptacle. The provision of the lid allows the food container of the invention to be used for food storage as well as for microwave cooking.

The receptacle part comprises an inner glass vessel or layer having an outer plastic vessel or layer in contact therewith. In some embodiments of the invention the two layers are intimately bonded together. In other embodiments, the glass and the plastic vessels fit together in a manner that allows them to be easily separated for cleaning. Both materials are selected to be microwave safe. The plastic material may have a high hardness or may be relatively soft and flexible at room temperature. Both layers may have the same transparency or color and opacity, or the layers may differ from each other, or may have designs imprinted thereon or impregnated therein.

Conventional glass bowls (e.g., made of Pyrex® #7200 borosilicate glass) are relatively heavy and have walls commonly four to five millimeters thick. Conventional plastic bowls (e.g., Rubbermaid ® Model 3053) have walls about one to three millimeters thick. This range of thickness of the plastic vessel or layer is sufficient to provide resistance to impact breakage or chipping, to provide thermal protection to the user, and to prevent overly rapid cooling of cooked food. Thus, the wall thickness of the inner glass bowl can be reduced and may, in some cases, be as little as one and one half millimeters.

The glass inner layer need not be designed to be a primary stress bearing member which is merely coated with plastic in order to improve the impact resistance of the glass. Rather, the plastic layer contributes significantly to the structural integrity of the food container, thus making it possible to reduce the thickness and thus the cost of the glass vessel component. Because the food container according to the present invention is only subject to normal household stresses, and not the stresses of shipping and merchandising, it need not be as break-resistant as certain large capacity disposable food containers. This, taken with the impact resistance of plastic, indicates that the food container of the present invention can be made very light weight, yet can have a long useful life. It may be noted that although thinner glass vessels are preferred in some instances, the invention is entirely operable in cases in which the glass vessel has a conventional wall thickness of four to five millimeters.

The relative height of the glass and plastic vessels can be adjusted to provide different benefits. In some embodiments of the invention the plastic layer covers the outside of the glass layer up to the mouth or rim area and provides a sealing lip onto which a lid may be pressed when food is stored in the container. In other embodiments, such as in a drinking vessel, the plastic may also cover the mouth or rim so as to protect the user's lips from being burned. In yet other embodiments the plastic exterior may be shorter than the glass interior so that the food does not contact the plastic or glass-plastic interface during cooking. In some such embodiments a lid may be supplied that seals onto a glass lip.

The foregoing has outlined rather broadly the more pertinent and important features of the present invention in order that the detailed description of the invention that follows may be better understood and so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other food containers for carrying out the same purposes of the present invention. It should also be realized by those skilled in the art that such equivalent structures do not depart from the spirit and scope of the invention as set forth in the appended claims.

Although it is believed that the foregoing recital of features and advantages may be of use to one who is skilled in the art and who wishes to learn how to practice the invention, it will be recognized that the foregoing recital is not intended to list all of the features and advantages. Moreover, it may be noted that various embodiments of the invention may provide various combinations of the hereinbefore recited features and advantages of the invention, and that less than all of the recited features and advantages may be provided by some embodiments.

DETAILED DESCRIPTION OF THE INVENTION

Figure 1:
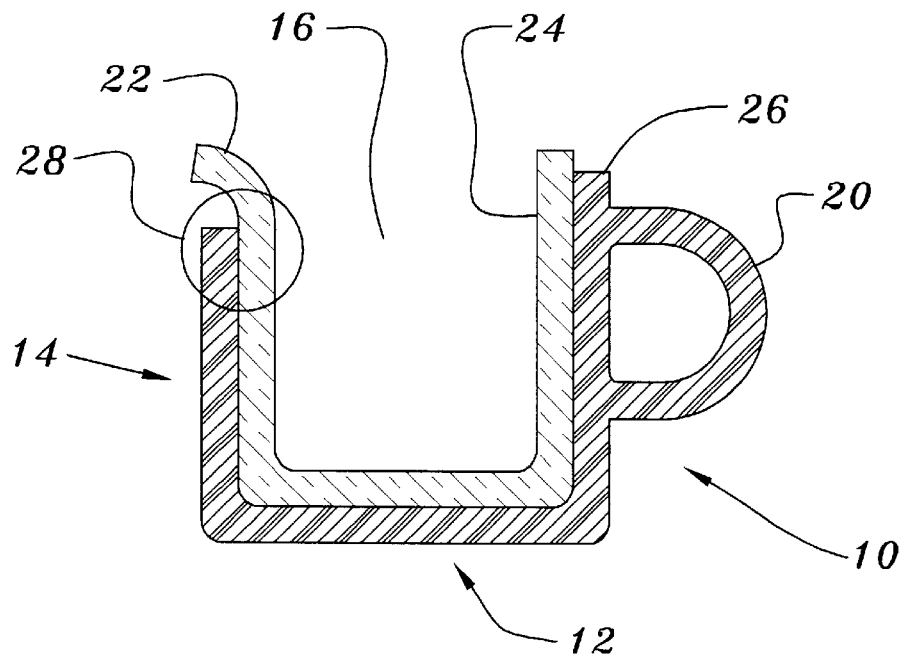
FIG. 1 is a vertical cross-sectional view of a gravy warmer according to the present invention.

A food container of the present invention 10 can have any shape conventionally associated with a food container, and most particularly has a bottom 12, a side wall or walls 14, and an upwardly directed opening defined by a rim or mouth 16. A lid 18, preferably but not necessarily plastic, is preferably associated with the container 10.

In a preferred embodiment of the invention, the container is designed for storing food, such as leftovers or individual meals. The food items are placed in the container and the container is closed using a leak-proof, air-tight, snap-fit or "burp" lid closure fitting, as is conventional in the plastic container industry (e.g., Tupperware®). The container of food is stored in a refrigerator for days or weeks. The container can then be taken from the refrigerator and taken along to the workplace as is. The food contents can then be heated at work in a conventional microwave oven. The heated food can be eaten, and the container re-sealed and brought back home for washing and reuse. While eating, the fork or eating utensil contacts a glass surface, giving the impression of eating from a glass dish.

The container may thus be relatively low and flat, or relatively tall and slender. The container may have one or more handles 20 formed thereon, or may have a pouring spout 22 formed thereon. The container is, however, designed to have a relatively large mouth. In a preferred embodiment the mouth has a diameter of two inches or larger to facilitate the removal of solid food and to prevent an "eruption" in the case of boiling liquids.

A gravy warmer and dispenser according to the present invention is depicted in vertical cross-section in FIG. 1. This container 10 comprises a glass inner layer or vessel 24 and a plastic outer layer or vessel 26 having a handle 20 formed thereon. It may be noted that although the glass inner vessel 24 is depicted in the various figures of the drawing as being made from a transparent glass, this vessel may also be an opaque glass, a ceramic body or a vitreous ceramic body of the sort commonly sold under the trade name Corningware®. As used herein, the word "glass" shall stand for all such inorganic glasses, ceramics and glass-ceramic composites, but shall not include composites, formed of glass particles or fibers dispersed in an organic polymeric body, and generally referred to as fiberglass, glass-reinforced plastic, FRP, or GRP. Although many commercially popular organic polymers are used in what a crystallographer would call a glass phase, all such organic materials are specifically excluded from the term "glass" as used herein. Preferred glasses are those used in glassware regularly used for cooking food directly on the fire or as ovenware. Pyrex™, Arcolac™ and Corelle™ are illustrative examples. Corelle™ is an impact resistant glass made by Corning Glass Works, and is stronger than most glass or china products. A drop or hard blow may cause the product to break or become damaged, causing later breakage without apparent reason. Most pieces are microwave safe.

The outer layer or vessel 26 is preferably made of any of a number of well known organic polymeric thermoplastic materials, but may also be a composite of a thermoplastic polymer and a strengthening material, such as fiberglass, carbon-fiber, etc. Moreover, the outer plastic vessel may be either a natural or a synthetic resin. The function of the outer layer is, on the one hand, to be flexible and impact resistant and thus prevent breakage of the inner layer, and on the other hand, in the case that breakage occurs, to contain the pieces of the shattered glass layer inside an elastic envelope and thus prevent exposure to the user.

The plastic outer layer or vessel 26 is preferably heat stable through a temperature range of at least 10° F. to 230° F., and preferably from −20° F. to 300° F. Selecting such a range of service temperatures ensures that the plastic vessel does not warp, or crack when used as an outer layer of a food container subjected to repeated heating and cooling. Moreover a preferred container has high resistance to discoloration or aging even after extended use. Specific examples of plastics include those disclosed in U.S. Pat. No. 5,908,128 (Krishnakumar et al) and U.S. Pat. No. 4,847,459 (Desai). Plastics such as polyethylene (from LDPE to HDPE) and polypropylene can be used, as well as polycarbonates, polyester, nylon, and blends of any of these, because the temperatures in a microwave do not rise very high when compared to a conventional oven.

Both the glass and plastic vessels are microwave transmissive, and allow the food, such as gravy, contained in the container to be heated by microwave energy. Because the food contacts the glass layer and not the plastic, the food does not blister or scar the inner wall of the container 10 during heating. Further, the container 10 does not impart any odor or taste to the food even after the food is stored for a prolonged period in the container. In the context of this specification, the term, "microwave transmitting material" is taken to include common glasses, ceramics and plastics.

An important consideration in the construction and use of a laminated microwave food container 10 is that of the nature of the interface between the glass 24 and plastic 26 vessels. In preferred embodiments of the container 10, both the glass 24 and plastic 26 vessels are thick enough and strong enough to be treated as free-standing vessels. This condition may be satisfied by a combination of a glass vessel having a thickness of one and one half or more millimeters and a plastic vessel having a thickness of one or more millimeters. Thus, one approach to making a food container of the invention 10 is to select the sizes of the glass and plastic free-standing vessels so the glass vessel 24 can both snugly interfit within the plastic vessel 26 when used for microwave cooking or food storage, and can easy be separated from the plastic vessel so that the two vessels can be separately cleaned and dried after each use and subsequently re-assembled to form the food container 10. At what may be considered to be the other extreme, one may also construct a laminated food container 10 of the invention by tightly bonding a plastic vessel 26 on the outside surface of a glass vessel 24.

Although both the easily separable and the firmly bonded embodiments are satisfactory, intermediates between these two extremes are generally not satisfactory because of problems arising from the penetration of water between the two vessels. If water is present in the interfacial region between the two vessels during microwave heating, the plastic outer shell may be locally overheated to an extent leading to blistering or warping. Moreover, if moisture is present in the confined region between two vessels for an extended storage period, various fungi and algae can grow there and pose a possible risk to the wholesomeness of food stored or cooked in such a container.

Arrangements for providing a satisfactory interface between a glass 24 and plastic 26 vessel may be understood by reference to FIGS. 2–5 of the drawing, which show cross-sectional detail views at the top of a container in the area generally indicated with the reference numeral 28 in FIG. 1.

Figures 2, 3:
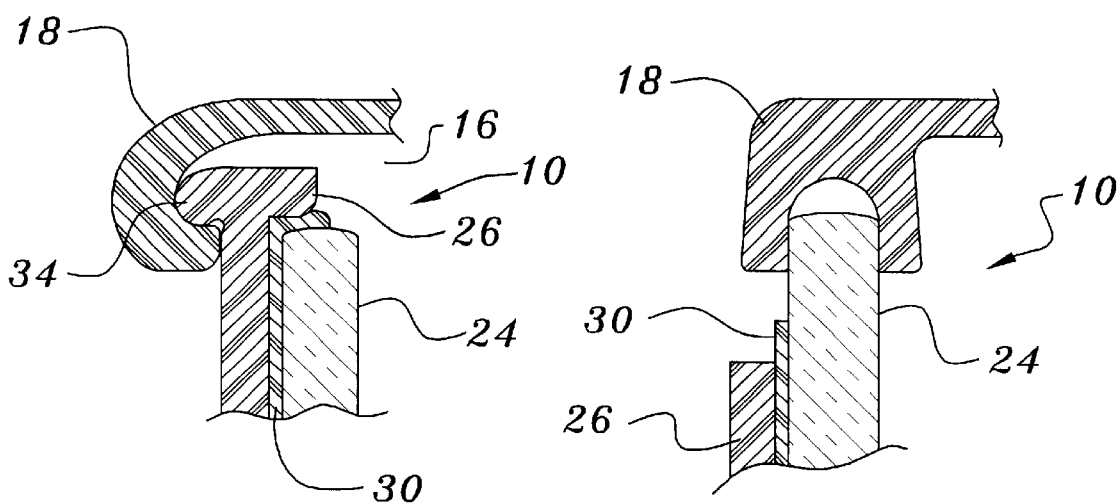
FIG. 2 is a vertical cross-sectional detail view of a portion of an adhesively bonded food container according to one embodiment of the present invention.
FIG. 3 is a vertical cross-sectional detail view of a portion of an adhesively bonded food container according to a second embodiment of the present invention.

In one embodiment of the invention a container 10 may comprise an inner glass layer or vessel 24 bonded to an outer plastic vessel 26 by means of an adhesive 30. If the adhesive 30 is a material approved for use with food, a configuration such as that depicted in FIG. 2 can be used. Here, a portion of the adhesive 30 is exposed at the mouth 16 of the container 10. On the other hand, if the adhesive 30 is not FDA-approved or is otherwise suitable for long-term contact with food, one can configure a container 10 so that the inner glass vessel 24 extends upwardly beyond the top of the outer plastic vessel 26, as depicted in FIG. 3. Here, the adhesive 30, even if a portion of it extends upwardly above the top of the plastic vessel 26, is not exposed to food stored or heated in the container.

In embodiments of the invention in which the inner and outer vessels are not bonded together, an air space may be provided between the two layers. Moreover, a filler material or projections may be provided in the space between the two vessels in order to support a thin glass vessel against breakage and to make it easier for a user to separate the two vessels when cleaning and drying them between uses.

Figure 4:
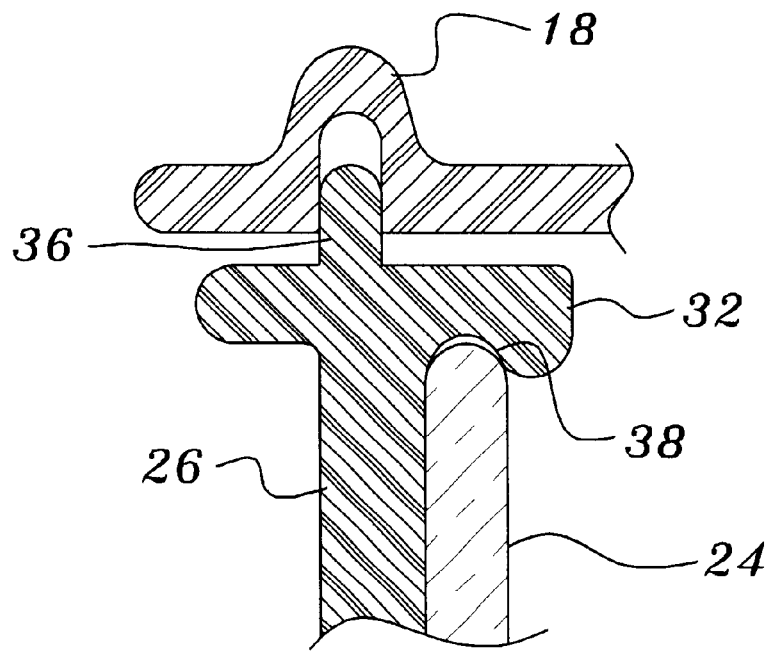
FIG. 4 is a vertical cross-sectional detail view of a portion of a detachably interfitted food container according to a third embodiment of the present invention.
Figure 5:
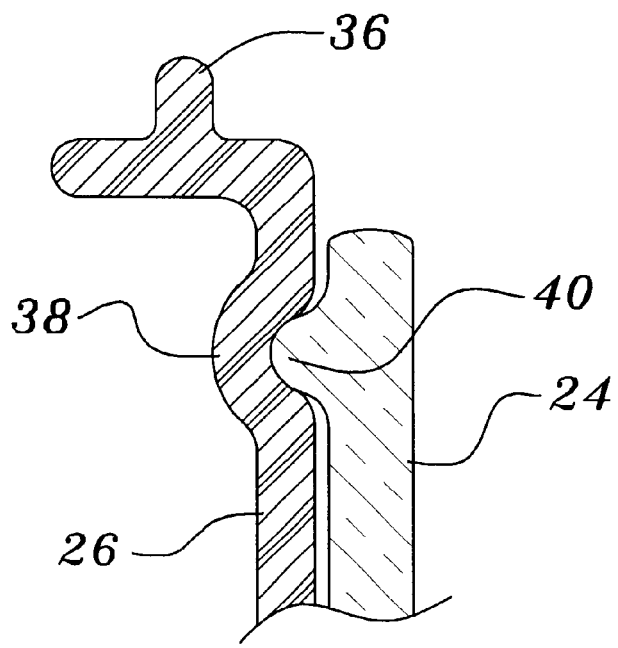
FIG. 5 is a vertical cross-sectional detail view of a portion of a detachably interfitted food container according to a third embodiment of the present invention.

In some embodiments of the invention, as depicted in FIGS. 4 and 5, the outer plastic vessel 26 may be snugly, but detachably, fitted around an inner glass vessel 24. In this case the inner glass vessel comprises sides extending upwards from a bottom 12 of the vessel by a selected height so as to form a mouth 16 having a selected diameter. The associated outer plastic vessel 26 has sides extending upwards from its bottom to a point adjacent the mouth of the glass vessel 24. The glass and the plastic vessels have cooperating linking means disposed adjacent their respective mouths so as to hold the two vessels together when in use, but that allow the two vessels to be readily detached from one another for cleaning. The plastic material chosen for this embodiment is selected to be flexible at room temperature, so when the vessels are to be cleaned and dried, a user can separate the two vessels by bending the wall of the plastic vessel if necessary to disconnect the linking means and thereby free the inner glass vessel 24 from the outer plastic one.

In one specific embodiment, as depicted in FIG. 4, the linking means comprises a retaining lip 32 arranged to protrude inwardly from the wall of the plastic vessel adjacent an upper end of the plastic vessel. When the two vessels are interfitted, this lip 32 extends over a wall of the glass inner vessel 24 by a slight distance so as to retain the glass vessel within the plastic one until a user separates the two vessels. The inwardly projecting lip 32 may have an internal molded groove 38 designed to receive the top of the glass vessel, as depicted in FIG. 4, or may have a more or less flat abutting surface. In either of these cases, a preferred lip 32 extends into the mouth of the glass vessel no more than is necessary to provide the retaining function. In a preferred embodiment, the lip 32 extends into the mouth of the glass vessel by no more than the wall thickness of the glass vessel.

Yet another embodiment of a temporarily interfitted composite bowl that can be easily disassembled for cleaning is depicted in FIG. 5. Here, the linking means comprises an outwardly extending protrusion 40 formed on an outer surface of the glass inner vessel 24. The protrusion 40 can take various forms and may be a continuous ring about the glass vessel, or may be a circumferential array of protruding islands that can coact with the plastic vessel. In some such arrangements the linking means comprises a corresponding groove or set of indentations may be molded into the internal surface of the plastic vessel. In other cases, the plastic material chosen for forming the inner vessel is sufficiently soft and flexible that an indentation is formed in the plastic vessel by the glass protrusion 40. Moreover, it is not necessary that the linking means be formed as a ring having a single selected height. The linking means may comprise a spiral protrusion that can threadably interfit with a mating spiral groove molded into the plastic vessel. It will be recognized by those skilled in the arts that many other sorts of linking means can be configured, these include, but are not limited to, an outwardly bent lip on the glass vessel interfitting with a groove in the inner surface of the plastic one, and a groove or grooves on the outer surface of the glass vessel cooperating with some sort of protrusion on the inner surface of the outer vessel.

There are also many approaches for providing a lid 18 for sealing the mouth 16 of a laminated food container 10. As depicted in FIG. 2, a lid 18 can engage an outwardly extending sealing lip 34 portion of the external plastic vessel 26. Alternately, as depicted in FIG. 4, the plastic vessel 26 may comprise an upwardly extending sealing lip 36. In embodiments of the invention in which the glass inner vessel 24 extends upwardly above the outer plastic vessel 26 one may provide a lid that engages the top of the glass vessel, as depicted in FIG. 3, or one may choose to make a lid with a downwardly extending skirt portion that can engage a sealing lip extending outwardly from the plastic vessel.

In considering the embodiments of the invention in which a glass vessel 24 is adhesively bonded within a plastic vessel 26, one needs to recognize that most thermoplastic materials do not easily bond to silicate glasses. Polyolefins, which are the plastics most commonly used for refrigerated food containers, are particularly difficult to bond because they have low surface energy and are not easily wetted by the polar components of most adhesives. Moreover, polyolefins have coefficients of thermal expansion that are about five times that of a borosilicate glass. This thermal expansion mismatch indicates that a particularly good bond is required in order to prevent a polypropylene outer shell from expanding away from a Pyrex liner. It may be noted that differential thermal expansion forces tending to break the plastic shell away from the glass liner can be reduced by assembling the two parts while the plastic is hot, and by reducing the wall thickness of the plastic at the top of the plastic part. In particular, it is helpful to provide a feathered edge that tapers to a near-zero plastic thickness for this purpose.

One approach to improving an adhesive bond between a thermoplastic and a silicate glass is to increase the surface energy by oxidation or other treatments, including flame oxidation, wet chemical oxidation, and plasma oxidation, that are well known to the trade. Proprietary primers for such surfaces may include silanes and titanates. Chemical absorption of adhesive reactants is another way to obtain bonds to otherwise unbondable surfaces, as occurs when amine curing agents absorb into silicone rubber molds and cause epoxy adhesives to stick to the molds after several uses. Surface modification can also be accomplished by using an interfacial mixture of the plastic and its adherent.

An interfacial bonding layer can also be used for this type of assembly. Copolymers such as ethylene-vinyl acetate, ethylene-ethyl acrylate, and ethylene-maleates are often useful as intermediates between polyolefin plastics and polar adhesives. Likewise, films of ionomers can be laminated to a thermoplastic to provide a bonding surface.

In one adhesively bonded embodiment of the invention a Pyrex® borosilicate glass bowl was formed having a circular flat bottom with a wall rising circumferentially thereabout to an extent of about seventy millimeters. This overall size of the glass bowl was selected so that it was a slip fit into a commercially available Model 3053 polypropylene bowl sold under the Rubbermaid® trade name. The outer surface of the glass bowl was treated with a commercially available primer sold by the Lord Corporation as their product number AP-134. The inner surface of the polypropylene bowl was treated with a commercially available primer sold by the Lord Corporation as their product number 459X. Both the glass and the plastic vessels were allowed to set at room temperature for one hour, as specified by the manufacturer of the primers. Enough of a urethane adhesive (Lord product number #7542 A/E) was placed in the polypropylene bowl so as to completely fill the interstitial volume between the glass and plastic bowls when the glass bowl was pressed into the plastic bowl. The composite bowl was allowed to cure at room temperature for two days. Following the cure period, the composite bowl was successfully subjected to ten cycles of a usage simulation test. The usage simulation test comprised the sequential steps of a) refrigerating the composite bowl; b) removing the composite bowl from the refrigerator and heating water in the bowl to boiling by using a domestic microwave oven; and c) placing the composite bowl in a domestic dishwasher and running it through a conventional dishwashing cycle.

Another adhesively bonded embodiment was made in accordance with the method described above, except that the plastic bowl was preheated in boiling water immediately before pressing the glass vessel within it. This embodiment, like the first one described above, survived intact after ten cycles of the usage simulation test.

In yet another adhesively bonded embodiment using the same combination of glass and plastic bowls, the inner surface of the plastic bowl was sprayed with a primer (sold as part number 770 by the Loctite® Corporation), and a freshly mixed epoxy adhesive (Loctite® #E-30CL) was placed in the plastic bowl before pressing the glass bowl into it. The assembly was weighted to keep the liner in place and the epoxy was allowed to cure for 24 hours. Thereafter, the bowl was tested for ten simulated use cycles as discussed above, and it survived intact. This adhesive was water-clear and colorless, an obvious advantage for a food container.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, because numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A micro-wave safe food container comprising, in combination:

a free-standing inner glass vessel having a bottom and at least one wall extending upwardly about the circumference of the bottom so as to define a mouth adjacent an upper end thereof;

a free-standing outer plastic vessel having an upper end, the free-standing plastic vessel fitting snugly about the inner glass vessel and bonded thereto so as to prohibit water from penetrating into an interfacial region between the two vessels; and an adhesive bonding layer disposed between the inner glass vessel and the outer plastic vessel so as to completely fill any interstitial volume therebetween.

2. The food container of claim 1 further comprising a lid for engaging an upwardly extending lip portion of the outer plastic vessel.

3. The food container of claim 1 wherein the plastic vessel is flexible at room temperature.

4. The food container of claim 1 wherein the plastic vessel is thermally stable over a temperature range extending from minus ten degrees Fahrenheit to two hundred thirty degrees Fahrenheit.

5. The food container of claim 1 wherein the mouth of the glass vessel is at least two inches in diameter.

6. The food container of claim 1 further comprising an outwardly extending lip portion of the outer plastic vessel.

7. A microwave-safe laminated food container comprising, in combination:

a free-standing plastic outer vessel having a bottom and at least one side wall extending upwardly and circumferentially about the bottom to a selected height above the bottom;

a free-standing glass inner vessel having a size selected so that the glass inner vessel fits snugly within the plastic outer vessel and so that a side wall of the glass inner vessel extends upwardly above the selected height so as to form an upwardly opening mouth of the laminated food container; and an adhesive bonding layer disposed between the inner and outer vessels so as to completely fill any interstitial volume therebetween.

8. The food container of claim 7 wherein the adhesive bonding layer comprises a material that is not approved for long-term contact with food.

9. The food container of claim 7 wherein the glass vessel comprises a mouth portion that is at least two inches in diameter.

10. The food container of claim 7 further comprising a lid for engaging the glass vessel so as to seal the container.

11. The food container of claim 7 wherein the plastic vessel is thermally stable over a temperature range extending from minus ten degrees Fahrenheit to two hundred thirty degrees Fahrenheit.

* * * * *